United States Patent [19]

Imamura et al.

[11] Patent Number: 6,076,725
[45] Date of Patent: *Jun. 20, 2000

[54] METHOD FOR FABRICATING WELDED ALUMINUM STRUCTURE

[75] Inventors: Yoshihaya Imamura; Kazuo Yonezawa, both of Fujisawa; Toru Hashimura, Kobe; Takahito Fujii; Tomohiro Kurokawa, both of Shimonoseki, all of Japan

[73] Assignee: Kabushiki Kaisha Kobe Seiko Sho, Kobe, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/868,141

[22] Filed: Jun. 3, 1997

[30] Foreign Application Priority Data

Jun. 5, 1996 [JP] Japan .................................. 8-143152

[51] Int. Cl.[7] ........................... B21D 39/00; B23K 31/02; B29C 65/00
[52] U.S. Cl. ........................... 228/164; 228/142; 228/170; 228/171; 156/304.5
[58] Field of Search ..................... 228/142, 170, 228/171, 164; 156/304.1, 304.5

[56] References Cited

U.S. PATENT DOCUMENTS

| | | | |
|---|---|---|---|
| 3,575,335 | 4/1971 | Baden | 228/40 |
| 4,078,712 | 3/1978 | Cook et al. | 228/170 |
| 5,190,207 | 3/1993 | Peck et al. | |
| 5,591,360 | 1/1997 | Mombo-Caristan | 219/121.64 |

FOREIGN PATENT DOCUMENTS

| | | |
|---|---|---|
| 19 05 637 | 8/1970 | Germany . |
| 76 09 197 | 3/1978 | Germany . |
| 3344075 | 7/1984 | Germany . |
| 37 00 131 | 7/1987 | Germany . |
| 43-24304 | 10/1968 | Japan . |
| 59-22631 | 5/1984 | Japan . |
| 62-166165 | 7/1987 | Japan . |
| 2-197377 | 8/1990 | Japan . |
| 06339789 | 12/1994 | Japan . |
| 08155636 | 6/1996 | Japan . |
| 811049 | 7/1981 | U.S.S.R. . |
| 1 443 792 | 7/1976 | United Kingdom . |
| 2 205 915 | 12/1988 | United Kingdom . |
| 2 277 289 | 10/1994 | United Kingdom . |

OTHER PUBLICATIONS

Patent Abstracts of Japan, vol. 95, No. 8, Sep. 29, 1995, JP 7-137655, May 30, 1995.
Patent Abstracts of Japan, vol. 95, No. 6, Jul. 31, 1995, JP 7-080570, Mar. 28, 1995.
Metals Handbook, Ed. 9, vol. 6, p. 69–72, 1983.

*Primary Examiner*—Patrick Ryan
*Assistant Examiner*—Kiley Stoner
*Attorney, Agent, or Firm*—Oblon, Spivak, McClelland, Maier & Neustadt, P.C.

[57] ABSTRACT

Sections 1 and 2 each in the form of a welded pipe (square pipe) are provided. The sections 1 and 2 are brought into abutment with each other so that the respective end faces 3a and 3b abut each other at a predetermined angle β between each section and its axial direction. The sections 1 and 2 are arranged symmetrically with respect to each other. Acute end portions of the abutted portion are chamfered to from a plane part. Corners of the sections 1 and 2 are rounded. In such a combined state of both sections, the abutted portion is welded in the circumferential direction to form a weld bead. As a result, penetration of weld metal to the section 1 and that to the section 2 become equal to each other. Thus, it becomes possible to fabricate a welded structure having a uniform weld bead and having improved strength and reliability of welded portions.

5 Claims, 15 Drawing Sheets

METHOD FOR FABRICATING WELDED ALUMINUM STRUCTURE

BACKGROUND OF THE INVENTION

1. Field of the Invention

The present invention relates to a method for fabricating a welded structure in which square sections of aluminum or an aluminum alloy, (hereinafter referred generically to as "aluminum material") are welded to form a body frame of an automobile or the like. Particularly, the invention is concerned with a welded structure having high reliability and strength of welded portions.

2. Description of the Related Art

Heretofore, a space frame structure has generally been used for supporting the body of an automobile or a transport plane through hollow pipe frames. FIG. 17 is a schematic diagram showing a space frame structure which is applied to an ordinary type of passenger cars. As shown in the same figure, a plurality of sections 51 which are each in the shape of a square pipe are provided and are welded at end portions thereof to end portions of other sections 51 to form welded portions 52. The sections 51 are fixed together by the welded portions 52 to form a space frame structure. An automobile body 54 is placed so as to cover the space frame 53. Various concrete methods have been proposed for forming the welded portions 52.

FIGS. 18 and 19 are perspective views each showing a welded portion 52 on a larger scale. In FIG. 18, an end portion 56a of a section 56 is in abutment with a side wall of an end portion 55a of a section 55, and the section 56 is fixed to the section 55 by forming a weld bead around the abutted portion. This welding method is generally adopted for the fabrication of a space frame because in comparison with other welding methods it is easy to weld the end portion 56a of the section 56 to the side wall of the end portion 55a of the section 55. There also is known such a welding method as shown in FIG. 19, which method uses a connector member 58. The connector member 58, which is bent 90° at the central portion, is disposed between the sections 55 and 56, and the end portion 55a of the section 55 is brought into contact with one end of the connector member 58, while the end portion 56a of the section 56 is contacted with the other end of the connector member 58. Then, weld beads 57a and 57b are formed around the contacted portions to connect the sections 55 and 56 through the connector member 58.

Various connector shapes and various connector-section connecting methods have been proposed (Japanese Patent Laid Open Nos. 80570/95 and 137655/95). However, the omission of connectors is desired because the use of connectors not only results in increase in weight of the vehicle body frame but also results in increase of the manufacturing cost. Therefore, a welded structure fabricated by direct connection of sections without the use of any connector member and capable of enhancing the weld strength has been proposed (Japanese Patent Publication No. 59838/94).

FIG. 20 is a perspective view showing welded structures (prior art). As shown in FIG. 20(a), there is used a section 61 which is in the shape of a square pipe. Of faces of the section 61, the face opposed to a section 62 is a main wall 61a having a thickness several times as large as the thickness of other walls 61b. An end portion of the section 62 is in abutment with the main wall 61a, and fillet welding is applied to this abutted portion to form a weld bead 57.

In the welded structure constructed as above, the main wall 61a is thicker than the other walls 61b, so when a load indicated by arrows A is imposed on the welded structure, the magnitude of a strain induced at a central portion 62a and that of a strain induced at an end portion 62b become almost equal to each other. That is, in the case where the main wall and the other walls are of the same thickness, the strain of the end portion 62b is larger than that of the central portion 62a, so that breaking may start from that strain concentrated portion. In the welded structure shown in FIG. 20(a), such breaking is prevented and both fatigue strength and rigidity are improved because of a uniform magnitude of strain. As shown in FIG. 20(b), the inner surface of the main wall 61a may be centrally formed at the central portion with a projecting portion 61c instead of thickening the main wall 61a.

However, the aforementioned prior art involves the following problems. FIG. 21 is an enlarged sectional view taken on line A—A in FIG. 20(a), and FIG. 22 illustrates in what manner the welded structure of FIG. 20(a) is formed by welding, in which (a) is a perspective view and (b) is a sectional view. As shown in FIG. 21, the angle between adjacent side walls is 90. Therefore, when fillet welding is performed along welding arrows 65, as shown in FIG. 22, it is necessary that the welding position of a torch 64 be changed abruptly at a corner 63e, and thus it is difficult to effect uniform welding.

As shown in FIG. 21, moreover, even when side walls 63a to 63d of the section 62 are equal in thickness $t_1$, a diagonal width $t_2$ of the corner 63e is $\sqrt{2} \times t_1$ because the angle between adjacent side walls is 90°. FIGS. 23(a) and (b) are enlarged sectional views taken on lines B—B and C—C, respectively, in FIG. 22(b), and FIG. 23(c) is a sectional view showing in what manner the weld metal portion illustrated in (b) breaks. When the welding current is set so as to give good penetration of a weld metal portion 66 of the side wall 63d, as shown in FIG. 23(a), since the thickness of the corner 63e is $\sqrt{2}$ times the thickness of the side wall 63d, as shown in FIG. 23(b), the penetration of the weld metal portion 66 at the corner 63e becomes insufficient, thus causing a large unmelted portion to remain inside the corner 63e. The presence of such an unmelted portion poses the problem that, as shown in FIG. 23(c), when a load is given in the arrowed direction in the same figure, breaking starts from the unmelted portion, leading eventually to breaking of the weld metal portion 66a. Generally, as to a broken state of a welded structure, it is preferably caused by a plastic deformation of a welding heat affected portion and of a base metal. Such breaking of the weld metal portion as mentioned above is not preferable. Further, in the case where the sections 61 and 62 are of the same external dimensions, there arise the following problems.

FIG. 24 is a schematic diagram of a welded structure using sections 61 and 62 of the same external dimensions, and FIGS. 25(a) and (b) are sectional views taken on lines D—D and E—E, respectively, in FIG. 24. In FIGS. 24 and 25, the portions common to FIG. 20 are indicated by the same reference numerals as in FIG. 20 and detailed descriptions thereof are here omitted. Where both sections 61 and 62 are of the same external dimensions, as shown in FIG. 24, there arises the problem that the occurrence of an unwelded area becomes conspicuous in a weld bead portion 57c of the weld bead 57 which portion 57c is formed downward from the upper end of the section 61. In the position where the weld bead 57c is formed, as shown in FIG. 25(b), the thickness on the section 61 side is X, while the wall thickness of the section 62 is t, and thus there is a marked difference between the thickness X and the wall thickness, t. Consequently, although penetration on the section 62 side becomes deep, penetration on the section 61 side becomes shallow, thus giving rise to the problem that a uniform weld bead 57 is not formed and there occurs an unwelded area. Particularly, at a corner 63*f*, as shown in FIG. 25(*a*), the width in a diagonal direction is √2 times as large, so that the proportion of the unwelded area on the section 61 side becomes still larger, in addition to that of the section 62.

The present invention has been accomplished in view of the above-mentioned problems and it is an object of the invention to provide a method for fabricating a welded structure of a high reliability having a high strength of welded portions.

According to the welded structure fabricating method in one aspect of the present invention, there are first provided first and second square sections of substantially the same wall thickness, then end portions of the first and second square sections are abutted with each other so that the angle between the end face of the first square section and an axis thereof is substantially the same as the angle between the end face of the second square section and an axis thereof, and the thus-abutted portion is welded in the circumferential direction. At the abutted portion, the width between the inner and outer peripheral edges of the end face of the first square section becomes equal to that of the end face of the second square section, so that both sections are almost equal in the degree of penetration of the respective melted portions in welding, thus affording a uniform weld bead. In this way the formation of an unmelted portion is suppressed, the reliability and strength of welded portions are improved, and breaking of weld metal portions is prevented.

Even in the above case, however, penetration in a corner of each square section is apt to be insufficient because of a large wall thickness thereof in the circumferential direction. Moreover, since it is necessary to change the welding position of a torch abruptly at the corner, it is difficult to perform welding continuously. It is preferable that the corner be roundish, whereby the wall thickness in proceeding direction of the torch in the circumferential direction is made uniform and penetration in that direction becomes more uniform, thus leading to further improvement in both reliability and strength of welded portions. Besides, it becomes possible to effect welding in a continuous manner.

At an acute part created on the abutted portion, the width between the inner and outer peripheral edges of each end face is large, so that penetration in the acute part is apt to become insufficient. To prevent this, it is preferable that the acute part be chamfered to form a plane part perpendicular to the end face of each section. As a result, the width between the inner and outer peripheral edges of the end face at the chamfered acute part becomes almost equal to the wall thickness of the abutted sections, thus resulting in uniform penetration and further improvement in strength of the welded portion. A filler metal may be applied to the plane part, whereby it is made possible to further improve the weldability.

According to the welded structure fabricating method in the second aspect of the present invention, there are first provided a square section and a cylindrical section, then an end face of the cylindrical member is chamfered so that the inner surface side thereof is convex. Any of various sectional shapes of the end face may be adopted. For example, the end face may have an inclined side portion. A through hole having a face which conforms to the end face is formed in the square section. Therefore, when the end face of the cylindrical member has an inclined side portion in its sectional shape, the through hole formed in the square section has an inclined face in its sectional shape. Next, the chamfered end face of the cylindrical section is aligned with the hole face of the square section and thereafter both are welded in the circumferential direction. As a result, the width between the inner and outer edges of the contact face of the cylindrical section and that of the square section become substantially equal to each other, and hence both reliability and strength of the welded portion are improved as in the welded structure fabricating method referred to above in the first aspect.

In forming a through hole having a hole face in a square section, no special limitation is placed on the inclination angle of the hole face, but it is preferable that the angle be 45° relative to the associated side face of the square section. In this case, the side portion of the end face of the cylindrical section also has an inclination angle of 45°. As a result, the contact faces of the cylindrical and square sections become equal to each other in the width between their inner and outer edges, and hence penetration in the cylindrical section and that in the square section become almost equal to each other, whereby the strength of the welded portion is further improved. Further, the cylindrical section can be stably fixed temporarily to the square section.

Also in the welded structure fabricating method according to the second aspect of the invention, it is preferable that the outer surface of each corner be roundish, as in the previous welded structure fabricating method. If the corner outer surface is not roundish, even if the width between the inner and outer edges of the contact face of the cylindrical section and that of the square section are kept equal to each other, it is difficult to make almost equal the penetration in the cylindrical section and that in the square section due to the influence of corners and side portions of the square section. Conversely, if the outer surfaces of the corners are roundish, both penetrations referred to above become almost equal to each other, so that the strength of the welded portion is further improved.

In this case, assuming that the radius of curvature of the outer surface of each corner is R and the width of a side portion of the square section is W, it is preferable that the outside diameter, d, of the cylindrical section be W−2R or less. If the outside diameter, d, exceeds W−2R, then when a through hole is formed in the square section, the outer peripheral portion of the through hole will reach the corner, resulting in deterioration in strength of the square section.

According to the welded structure fabricating method in the third aspect of the present invention, of the corners of a first square section, at least the corners opposed to a second square section has a roundish outer surface. Likewise, also as to the corners of the second square section, at least the corner opposed to the first square section has a roundish outer surface. Side portions of such sections are combined together in such a manner that their axes extended in the same direction. As a result, grooves are formed because the combined corners are roundish. Then, welding is performed along the formed grooves. Since the grooves are of a symmetric shape with side portions (boundary surfaces) of the first and second square sections as symmetric surfaces, penetration of the first square section and that of the second square section become almost equal, so that both sections are strongly combined together and the reliability of the welded structure is improved.

In this case, first and second through holes may be formed in the first and second square sections, respectively, and then both sections may be combined together so that the through holes are coaxial with each other. As a result, the first and second square sections can be positioned more easily with respect to each other. Further, the hollow spaces of the first and second square sections are contiguous to each other through the through holes, even when the event the air or any other gas present within the hollow spaces expand during welding, there is no fear of the expanded gas blowing off from the molten pool during welding, because the gas can move through the through holes.

In addition to both through holes mentioned above there may be formed a third through hole in the first square section for insertion of a fiber scope or the like therethrough to check the welding state of the sections from the inner surface side. Since the hollow portions of the first and second square sections are contiguous to each other through the first and second through holes, the fiber scope which has passed through the third through hole further passes through the first and second through holes and can enter the interior of the second square section from the first square section. In this way the welding state of the first and second square sections can be checked from the inner surface side. Even when the first and second square sections are connected to other sections, the welding state of each section can be checked from the inner surface side in the same way as above if only the hollow portions of the sections are interconnected via through holes or the like.

According to the welded structure fabricating method in the fourth aspect of the present invention, with end faces of first and second cylindrical sections in a section perpendicular to a weld bead as a reference, the first and second cylindrical sections are arranged in such a manner that the width between the inner and the outer edge of a contact face of the first section and that of the second section are substantially equal to each other, and then welding is applied around the end faces. In the case of a curved weld bead, a section perpendicular to the weld bead is assumed at each of various points of the curve. Such an arrangement of sections is obtained by ramping end portions of the sections so that the angle between one cylindrical section and an end face thereof is the same as the angle between the other cylindrical section, and thereafter bringing the end portions into abutment with each other. Alternatively, one end (end portion) of a cylindrical section (first cylindrical section) may be formed with a projection and this projection may be fitted in a recess formed in another cylindrical section (second cylindrical section). After the first and second cylindrical sections are arranged in this fashion, welding is performed around their end faces, whereby there is obtained a welded structure improved in both reliability and strength of the welded portion.

In all of the welded structure fabricating methods in the above first to third aspects, when the corners of sections used are roundish, it is preferable that the radius of curvature R of the outer surface of each corner and the radius of curvature, r, of the inner surface thereof be within the following ranges.

Radius of Curvature of Corner Outer Surface: preferably $t < R < H_1/3$

Given that an external dimension of a short side in a section perpendicular to the axis of a square section is $H_1$ and the wall thickness thereof is t, if the radius of curvature R of the outer surface of each corner is smaller than t, it becomes difficult to make constant the wall thickness in the circumferential direction of the corner. On the other hand, if the radius of curvature R exceeds $H_1/3$, the sectional shape of a square section becomes generally circular, resulting in deterioration of the working efficiency. It is therefore preferable that the radius of curvature of the corner outer surface be set at $t < R < H_1/3$.

When the radius of curvature R of the corner outer surface is set in the above range, if the radius of curvature r of the corner inner surface in a section perpendicular to the axis of a square section is R−t, then the wall thickness in the circumferential direction of the corner can be made equal to the wall thickness, t. As a result, there is obtained a uniform bead and the strength of the welded portion is improved.

In the welded structure fabricating method according to the first aspect of the present invention, when a plane part perpendicular to end faces of sections is formed by chamfering the abutted portions of the sections, the width between the inner and the outer peripheral edge of the end face in each abutted portion is preferably within the following range.

Width T between Inner and Outer Peripheral Edges of End Face: preferably $t/2 \leq T \leq t$ If the width T between the inner and outer peripheral edges of each end face is less than t/2, it is difficult to obtain a uniform weld bead because the width T is too small. In order to keep constant the width T and the wall thickness of a square section, T=t is preferred. In this case, however, the width of the plane part becomes smaller. Further, when the width T exceeds the wall thickness, t, it becomes difficult to apply a filler metal to the plane part because the width of the plane part becomes too small. Thus, when the plane part is formed, it is preferred that the width T between the inner and outer peripheral edges of the end face be set at $t/2 \leq T \leq t$.

SUMMARY OF THE INVENTION

The present invention has been accomplished to solve the above-mentioned problems and it is an object of the invention to provide a method for fabricating a welded structure having high strength and reliability of welded portions.

According to the first welded structure fabricating method of the present invention, an end face of a first square section formed of aluminum or an aluminum alloy and an end face of a second square section also formed of aluminum or an aluminum alloy are brought into abutment with each other and then this abutted portion is welded in the circumferential direction, wherein the first and the second square section have substantially the same wall thickness, the angle between the end face of the first square section and the axis thereof is substantially the same as the angle between the end face of the second square section and the axis thereof, an acute part of the abutted portion is chamfered to form a plane part perpendicular to the end faces of the first and second square sections, and the outer surface of each corner of the first and second square sections is roundish to make the wall thickness in the circumferential direction uniform.

Preferably, the welding is performed after application of a filler metal to the above plane part. Preferably, given that the wall thickness of the first and second square sections is t and the width between the inner and outer peripheral edges of each end face in the abutted portion is T, then t and T satisfy the relation of $t/2 < T < t$. Preferably, if an external dimension of a short side in a section perpendicular to the axis of first square section is $H_1$ and the wall thickness is t, the radius of curvature R of the outer surface of the foregoing corner meets the relation of $t < R < H_1/3$.

According to the second welded structure fabricating method of the present invention, an end face of a cylindrical section formed of aluminum or an aluminum allow is brought into abutment with a side portion of a square section formed of aluminum or an aluminum alloy, followed by welding, wherein the end face of the cylindrical section is chamfered so that the inner surface side is convex, the outer surface of each corner of the square section is roundish, the square section is formed with a through hole having a hole face conforming to the end face of the cylindrical section, the end face of the cylindrical section is fitted on the hole face of the square section, and thereafter both are welded in the circumferential direction.

Preferably, the hole face of the through hole is inclined at an angle of 45° relative to a side face of the square section. Further, if an external dimension of a short side in a section perpendicular to the axis of the square section is $H_1$ and the wall thickness thereof is t, it is preferable that the radius of curvature R of the outer surface of the foregoing corner satisfies the relation of $t<R<H_1/3$.

Preferably, the radius of curvature, r, of the inner surface of the corner in the section perpendicular to the axis of the the square section is $r=R-t$. Further, if the width of the above side portion is W, it is preferable that the outside diameter, d, of the cylindrical section satisfy the relation of $d \leq W-2R$.

According to the third welded structure fabricating method of the present invention, a side portion of a first square section formed of aluminum or an aluminum alloy and a side portion of a second square section formed of aluminum or an aluminum alloy are brought into abutment with each other so that their axes extended in the same direction, and the abutted portion of both sections is welded in the direction of their axes, wherein the outer surface of each corner of the first square section opposed to the second square section and that of each corner of the second square section opposed to the first square section are roundish.

Preferably, a first through hole is formed in the side portion of the first square section opposed to the second square section, a second through hole is formed in the side portion of the second square section opposed to the first square section, and both first and second square sections are brought into abutment with each other so that the first and second through holes are coaxial with each other. Further, a third through hole may be formed in the first square section.

Preferably, given that an external dimension of a short side in the section perpendicular to the axis of the first square section is $H_1$ and the wall thickness thereof is t, the radius of curvature, r, of the outer surface of the corner meets the relation of $t<R<H_1/3$.

Further, it is preferable that the radius of curvature, r, of the inner surface of the corner in a section perpendicular to the axes of the first and second square sections be $r=R-t$.

According to the fourth welded structure fabricating method of the present invention, a first cylindrical section formed of aluminum or an aluminum alloy and a second cylindrical section formed of aluminum or an aluminum alloy are brought into abutment with each other, and thereafter the abutted portion of both first and second sections is welded, wherein the abutted face of the first cylindrical section and that of the second cylindrical section are substantially the same in the width between the respective inner and outer edges.

DESCRIPTION OF THE PREFERRED EMBODIMENTS

Preferred embodiments of the present invention will be described hereinunder with reference to the accompanying drawings.

Figure 1A:
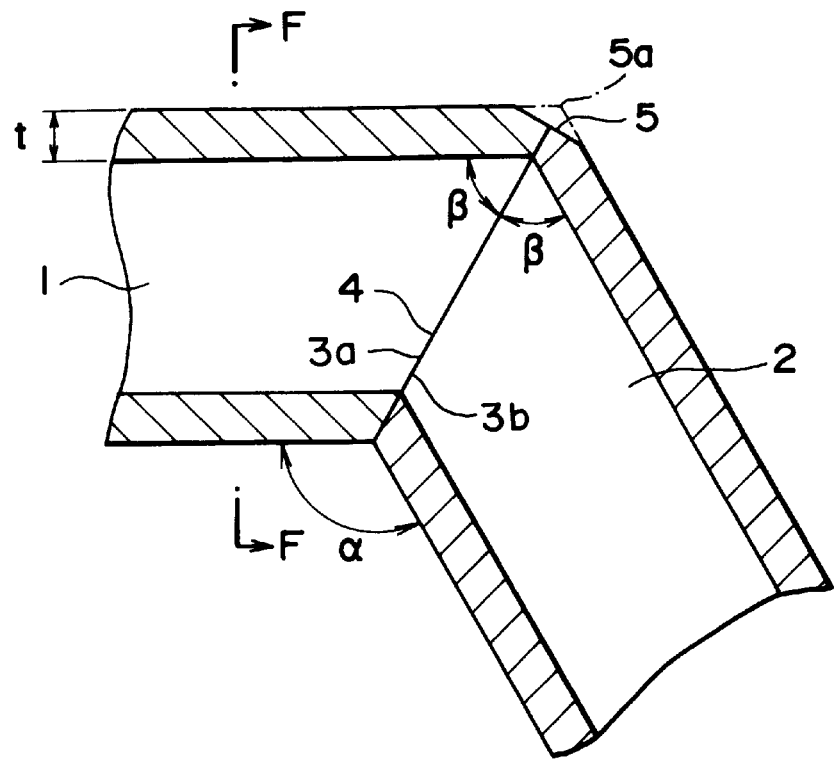
FIG. 1 is a sectional view showing the first welded structure fabricating method according to the present invention.
Figure 1B:
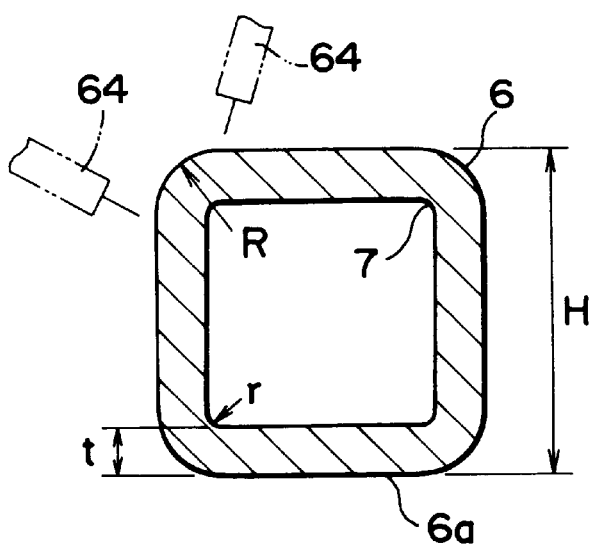

FIG. 1 is a sectional view showing step by step a welded structure fabricating method according to the first embodiment of the present invention, in which (a) is a sectional view of a connection and (b) is a sectional view taken on line F—F in (a). The first embodiment relates to a method wherein sections are abutted with each other at cut sections thereof and are welded together circumferentially to fabricate a welded structure. As shown in FIG. 1(a), first sections 1 and 2 each in the shape of a square pipe are provided. The sections 1 and 2 are each square in section, and inner and outer peripheral dimensions of the section 1 are the same as those of the section 2. Given that the angle between an end face of the section 1 and an axial direction thereof is β, this angle α is set at 60° and a combined angle of both sections is set at 120°, then both sections 1 and 2 are abutted with each other so that respective end faces 3a and 3b come into close contact with each other to form a boundary surface 4. The sections 1 and 2 are arranged so as to take symmetric positions. An acute part 5a on the boundary surface 4 is chamfered to form a plane part 5 perpendicular to the boundary surface 4. As shown in FIG. 1(b), moreover, an outer surface 6 and an inner surface 7 of each corner of the section 2 are made roundish (curved) at radius of curvature of R and r, respectively. This is also the case with the section 1.

Figure 2:
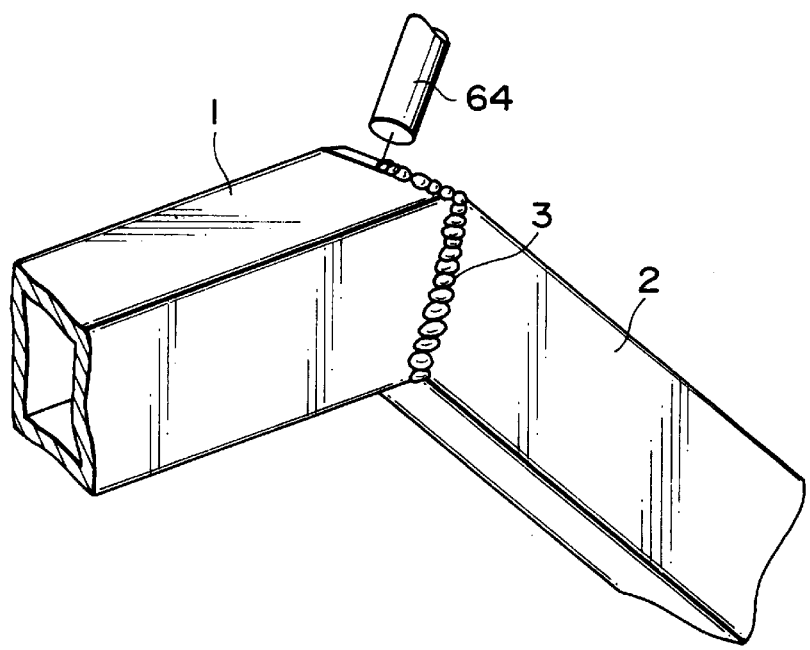
FIG. 2 is a perspective view showing manipulation of electrode performed by a welding torch in the first welded structure fabricating method.

As shown in FIG. 2, a torch 64 is moved along the boundary surface 4 of the sections 1 and 2 which are thus abutted together at their end portions, to form a weld bead 3. The torch 64 moves smoothly along the curvature of the outer surface 6 of each corner, as shown in FIG. 1(b). In this way it is possible to form a smooth weld bead, and both strength and reliability of the welded portion are improved.

If the plane part 5 is not formed, the width T2 between the inner and outer peripheral edges at the acute part 5a becomes larger as compared with the wall thickness, t, of each section 1 and 2. However, since the plane part 5 is formed, the width T between the inner and outer peripheral edges of each end face at the acute part 5a can be made equal to or smaller than the wall thickness t of each section 1 and 2. Thus, it is possible to apply a filler metal to the plane part. The formation of the plane part 5 results in formation of a new acute part 5b on the outer surface of each section 1 and 2, although the acute part 5b is less acute than the acute part 5a, there is formed a satisfactory weld bead.

Preferably, the radius of curvature R of the outer surface 6 of each corner shown in FIG. 1(b) meets the relation of t<R<H/3. Given that the external dimension of each section is H and the wall thickness thereof is t, the radius of curvature R of the corner outer surface 6 shown in FIG. 1(b) is set within the range of t<R<H/3 and that of the corner inner surface 7 is set at R–t. As a result, the wall thickness in the circumferential direction of the corner becomes uniform and it is possible to move the torch 64 smoothly along the boundary surface 4 and weld the sections 1 and 2 in a satisfactory manner. When the corner wall thickness is to be kept uniform, as mentioned above, it is necessary that the radius of curvature, r, of the corner inner surface 7 be set at R–t and that therefore the radius of curvature R of the corner outer surface 6 at least correspond to the wall thickness, t. However, if t=R, the radius of curvature of the corner inner surface 7 becomes zero and hence the inner surface 7 becomes a bent surface. The presence of such a bent portion at the inner surfaces of the sections 1 and 2 results in deteriorated strength of the resulting welded structure. Therefore, it is preferable that the radius of curvature R of the corner outer surface 6 be larger than t.

On the other hand, the value of the radius of curvature R can take a maximum of H/2 mathematically, however, when the radius of curvature is H/2, the sections 1 and 2 are not square pipes but cylindrical pipes. Usually, since the sections 1 and 2 are square pipes, by contacting the two with each other on a horizontal plane, both sections can be stabilized and a frame-shaped structure for example can be fabricated by welding. On the other hand, in the case of cylindrical shapes, such stability is impaired and it becomes difficult to effect positioning at the time of fabrication of the frame-shaped structure. Therefore, it is preferable that the radius of curvature R be at least less than H/2 and that in order to maintain square pipes substantially stable, it is preferable that the width of the plane portion 6a shown in FIG. 1(b) be H/3 or so and that therefore the radius of curvature R be less than H/3.

For the above reason, the radius of curvature R of the corner outer surface 6 is set within the range of t<R<H/3. For example, when the external dimension H is 50 mm and the wall thickness, t, is 3 mm, it is preferable that the radius of curvature R of the corner outer surface 6 be set within the range of 3 mm<R<16.7 mm. Therefore, if the radius of curvature R is set at 5 mm for example, the radius of curvature, r, of the corner inner surface 7 is set at 2 mm.

Figure 4:
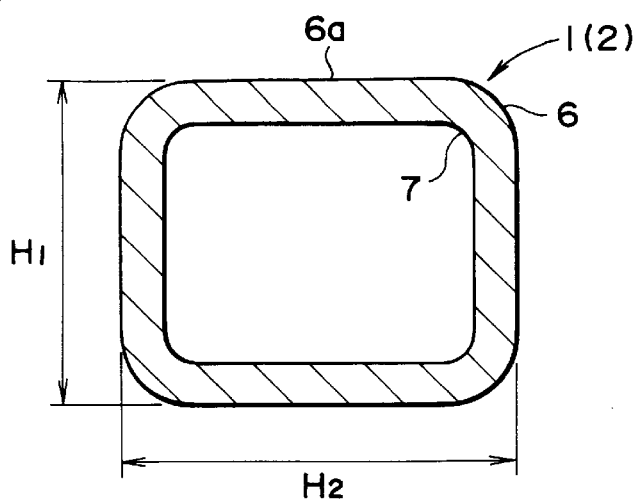
FIG. 4 is a sectional view showing a section of a rectangular sectional shape.

In the case where the sections 1 and 2 are of a rectangular shape in section as shown in FIG. 4 and external dimensions $H_1$ and $H_2$ are different, the radius of curvature R of the corner outer surface 6 is set assuming that the external dimension, $H_1$, of a short side is H.

Figure 3:
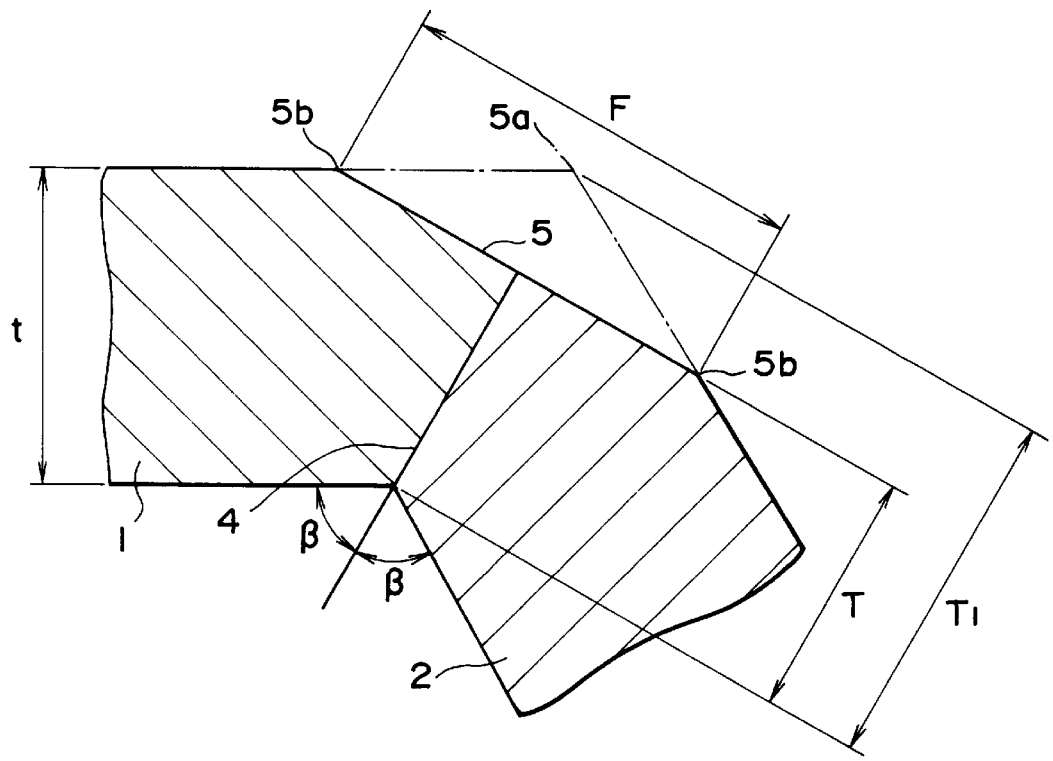
FIG. 3 is an enlarged sectional view of a welded portion in FIG. 2.

Preferably, the width T between the inner and outer peripheral edges of an end face at the plane portion 5 shown in FIG. 3 is set within the range of $t/2 \leq T \leq t$. If the width T at the boundary surface 4 of both sections 1 and 2 is reduced by setting it within the range of t/2 to t, the plane part 5 has a width sufficient to apply a filler metal thereto since its width F is 2 cos β(t–T sin β). Thus, by this reduction in the width, the weldability is improved and it becomes possible to obtain a uniform weld bead. Besides, by applying a filler metal to the plane part 5, it is possible to prevent breaking from the welded portion and improve both reliability and weld strength. For example, given that the wall thickness, t, and angle β both shown in FIG. 1 are 3 mm and 60°, respectively, if the plane part 5 is omitted, the width T1 at the boundary surface 4 is about 3.5 mm. If the width T1 is such a large width, not only it is impossible to obtain a uniform weld bead, but also arcing becomes unstable because it is necessary that welding be directed to the acute part 5a. Therefore, it is desirable to reduce the wall thickness T1 at the boundary surface 4. For example, however, if the wall thickness, t, and angle β are of the foregoing values, if the width T and the wall thickness, t, are set equal to each other, the width F of the plane part 5 becomes about 0.2 mm, which is fairly narrow. Such a narrow width F of the plane part 5 is disadvantageous in that it is difficult to apply a filler metal to the plane part. For this reason, the width T at the boundary surface of the sections 1 and 2 is set within the range of $t/2 \leq T \leq t$.

Although in the above embodiment the angle β is set at 60°, it is needless to say that the angle β may be of another value.

Figure 5A:
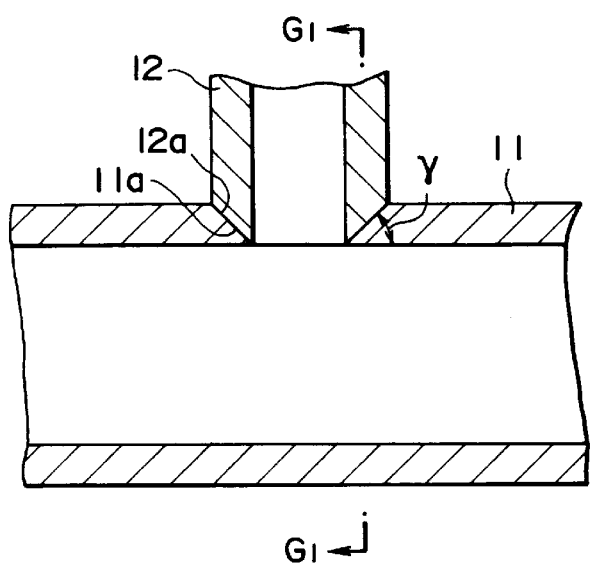
FIG. 5 is a sectional view showing the second welded structure fabricating method according to the present invention.
Figure 5B:
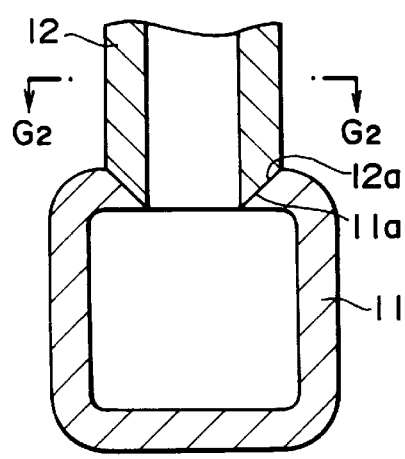
Figure 5C:
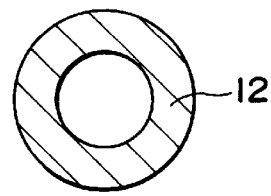
Figure 6:
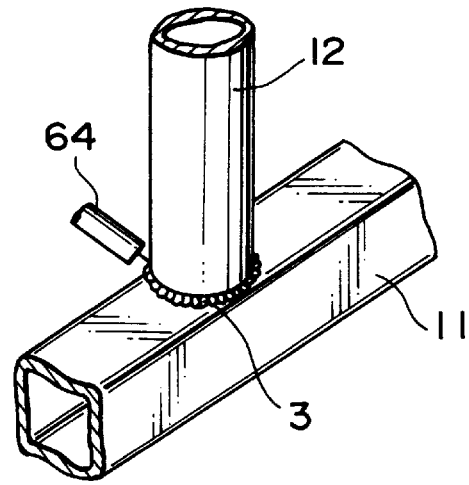
FIG. 6 is a perspective view showing manipulation of electrode performed by a welding torch in the second welded structure fabricating method.
Figure 7:
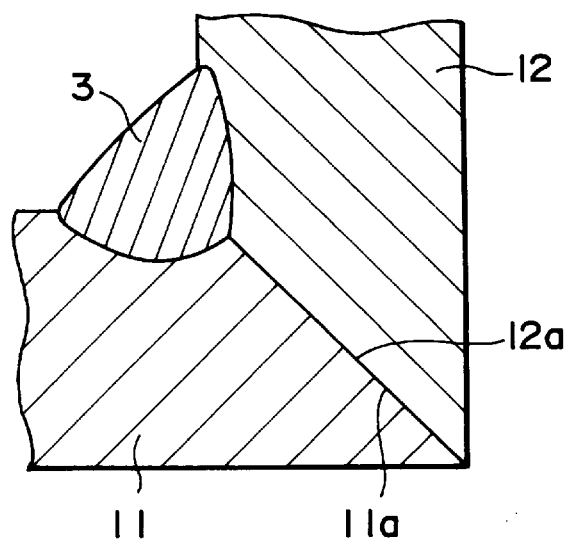
FIG. 7 is a sectional view showing on a larger scale a weld bead illustrated in FIG. 6.

FIGS. 5 to 7 illustrate a welded structure fabricating method according to a second embodiment of the present invention, in which FIG. 5(a) is a front view, (b) is a sectional view taken on line $G_1$—$G_1$ in (a), and (c) is a sectional view taken on line $G_2$—$G_2$ in (b), FIG. 6 is a schematic diagram showing in what manner welding is performed, and FIG. 7 is a sectional view showing a weld bead in FIG. 6 on a larger scale. In the method of the second embodiment, an end portion of a section is welded to a side portion of another section to fabricate a welded structure. As shown in FIGS. 5(a) and (b), a section 11 is in the shape of a square pipe, and a through hole (a counter-sunk portion) 11a having a hole face is formed in a side portion of the square pipe 11. The through hole 11a is in the shape of a spot-faced groove, with its diameter being larger toward the outside. A section 12 is cylindrical, and an end portion 12a thereof is chamferred so that its inner surface side is convex, whereby the end portion 12a of the cylindrical section 12 is matched to and fitted in the through hole 11a of the section 11 in a closely contacted state. An inclination angle, γ, of the through hole 11a may be set arbitrarily, for example, 45°. The end portion 12a of the section 12 is chamferred beforehand in conformity with the through hole 11a.

After the end portion 12a of the cylindrical section 12 has been fitted in the through hole 11a of the section 11, a torch 64 is moved around the section 12 to form a weld bead 3, thereby welding the section 12 to the section 11, as shown in FIG. 6. As a result, as shown in FIG. 7, there is obtained a symmetric groove shape with respect to the boundary surface (contact surface) between the sections 11 and 12, that is, the width between the inner and outer edges of the cylindrical section and that of the square section become substantially equal to each other at the boundary surface. Consequently, penetration of the weld bead to the sections 11 and that to the section 12 become equal to each other, so that breaking starting from an unmelted portion is prevented and both sections 11 and 12 are firmly welded together.

Figure 8:
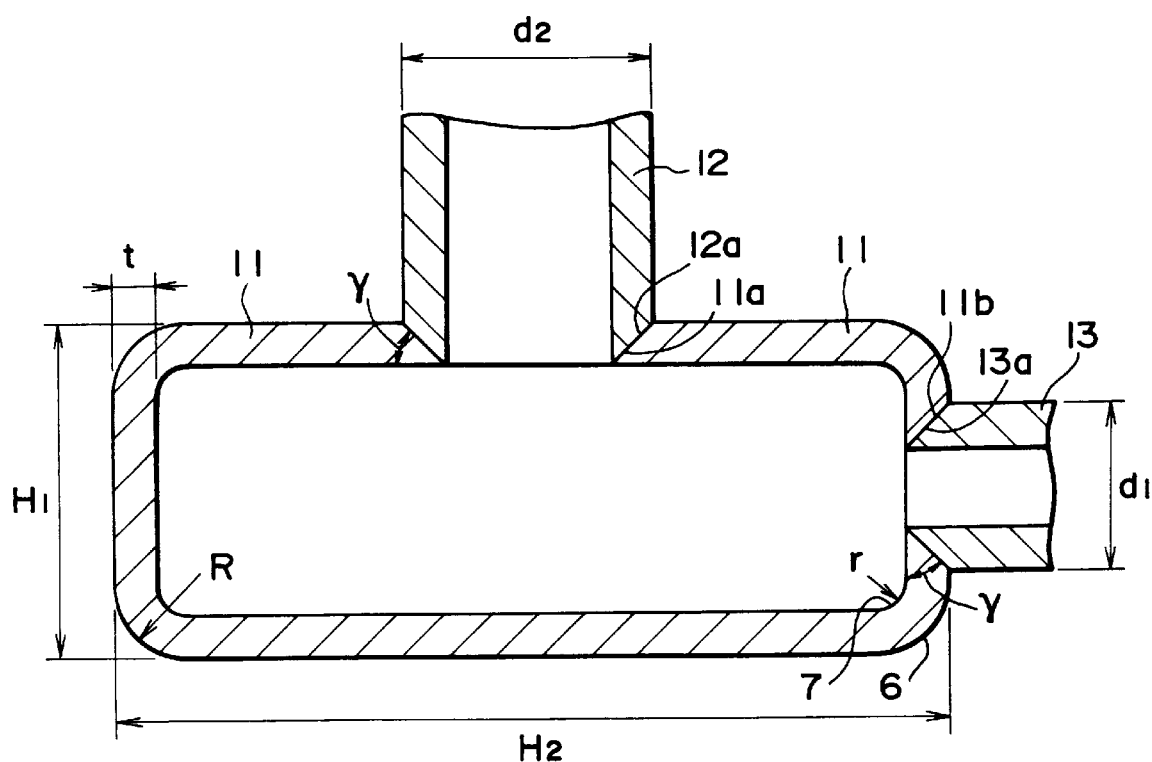
FIG. 8 shows another form of a welded structure obtained by the second welded structure fabricating method of the invention.

FIG. 8 is a sectional view showing a modification of the second embodiment. In FIG. 8, the same portions as in FIG. 5(b) are indicated by the same reference numerals as in FIG. 5(b) and detailed explanations thereof are here omitted. Also in this modification, as shown in FIG. 8, the section 11 is a square pipe, but a short side $H_1$ and a long side $H_2$ are different in length, and an inner surface 7 of each corner of the section 11 is roundish at a radius of curvature, r. A through hole 11a is formed in a long side and a through hole 11b is formed in a short side. A section 13 is fitted in the through hole 11b. The section 13, like the section 12, is also cylindrical and an end portion 13a thereof chamferred so that its inner surface is convex. Consequently, the end portion 13a is fitted in the through hole 11b in a closely contacted state. Outside diameters of the cylindrical sections 12 and 13 are designated $d_2$ and $d_1$, respectively, $d_2$ being larger than $d_1$. Thus, even when the section 11 is rectangular in cross section, the sections 12 and 13 can be welded strongly to the section 11 by circumferential welding. Accordingly, when the sections 11 and 12 are welded to the section 11 to form a beam or the like extending in three-dimensional directions, the beam thus formed has a high strength.

If the radius of curvature of the outer surface of a corner is R and the width of a side portion of a cylindrical section is W, it is preferable that the outside diameter, d, be set as $d \leq W-2R$. As in this modification, however, when the section 11 has a rectangular sectional shape and the sections 12 and 13 are fitted in long and short sides, respectively, of the section 11, it is preferable that the outside diameters $d_1$ and $d_2$ of the sections 12 and 13 be set so as to satisfy the relations of $d_1 \leq H_1-2R$ and $d_2 \leq H_2-2R$, respectively. When a through hole 11a is formed in the section 11 and the sections 12 and 13 are fitted in the through hole 11a, respectively, if the sections 12 and 13 are made cylindrical, it is possible to form the through hole 11a circularly in a sectional shape and hence possible to form throuth hole 11a easily with a drill or the like. If $d_1$ exceeds $H_1-2R$, the outer periphery of the through hole 11b reaches corners of the section 11, so that the strength of the section 11 is deteriorated. This is also true of the case when $d_2$ exceeds $H_1-2R$. Therefore, it is desirable to set $d_1$ and $d_2$ at $d_1 \leq H_1 2R$ and $d_2 \leq H_2-2R$.

For example, if $H_1=H_2=50$ mm, the radius of curvature R of the corner outer surface 7 is 5 mm, and the wall thickness, t, of each of the sections 11 to 13 is 3 mm, then it is preferable that $d_1$ and $d_2$ be each set at a value of 40 mm or less.

Although in the above embodiment the inclination angle, γ, of the through holes 11a and 11b is set at 45°, this value does not constitute any limitation. However, for forming as symmetric a groove as possible with respect to the boundary surface between the section 11 and each of the cylindrical sections 12, 13 and for making penetration to each of the cylindrical sections 12,13 and penetration to the square pipe section 11 almost equal to each other to form a uniform weld bead 3, it is preferable for the inclination angle γ to be 45°. If the inclination angle γ is set at 45°, it is possible to fix the sections 12 and 13 to the section 11 temporarily in a stable manner. If the inclination angle γ is smaller than 45°, front ends 12a and 13a of the cylindrical sections 12 and 13 are each at an inclination angle γ exceeding 45°, so that the groove formed is asymmetric right and left. This state results in poor penetration to the sections 12 and 13, and the resulting weld bead is apt to become unsatisfactory. On the other hand, an inclination angle γ exceeding 45° results in insufficient penetration to the section 1, and the weld bead obtained is apt to become poor. Therefore, it is preferable that the inclination angle γ of the through hole 11 be set at 45°.

Figure 9A:
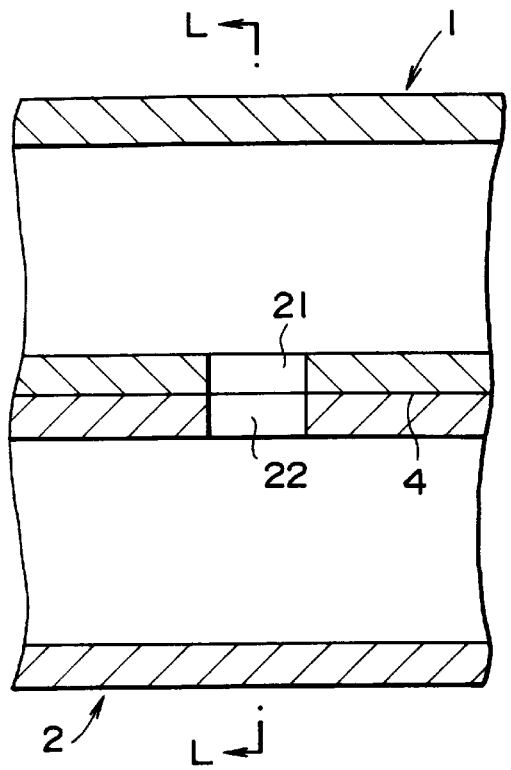
FIG. 9 is a sectional view showing the third welded structure fabricating method according to the present invention.
Figure 9B:
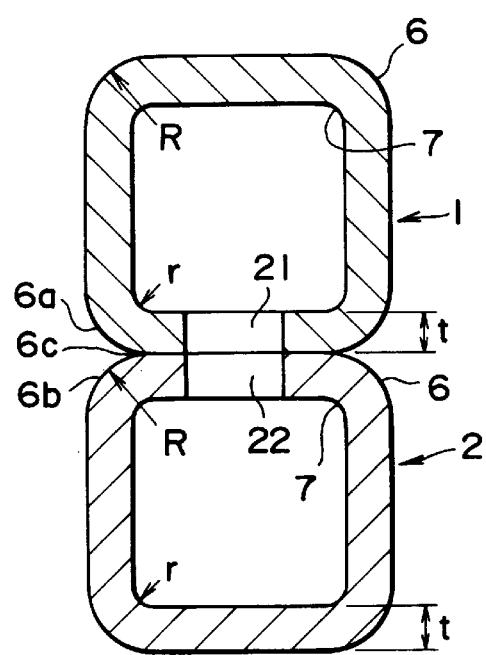
Figure 10:
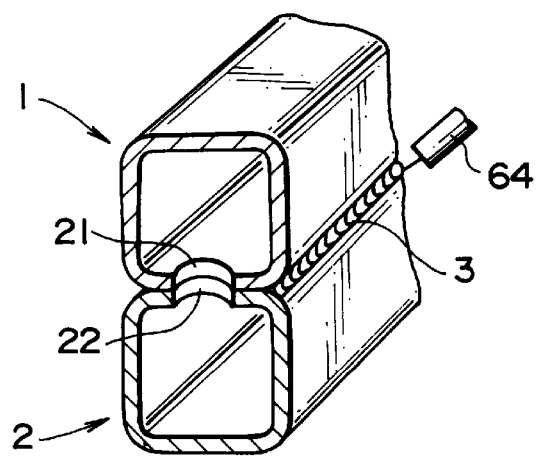
FIG. 10 is a perspective view showing manipulation of electrode performed by a welding torch in the third welded structure fabricating method.

FIGS. 9 and 10 illustrate a welded structurefabricating method according to the third embodiment of the present invention, in which FIG. 9(a) is a sectional front view of sections and (b) is a sectional view taken on line L—L in (a), and FIG. 10 is a schematic diagram showing in what manner welding is performed. In FIGS. 9 and 10, the same portions as in FIG. 1(a) are indicated by the same reference numerals and detailed explanations thereof are here omitted. According to the welded structure fabricating method of the third embodiment, side faces of sections are welded together. More specifically, as shown in FIG. 9, there are provided sections 1 and 2 of the same shape. Outer surfaces 6 of corners of the sections 1 and 2 are rounded. Although no special limitation is placed on the radius of curvature of each corner outer surface 6, it is preferable that the radius of curvature be the same as that defined in the first embodiment. Next, a through hole 21 is formed in one side of the section 1 and a through hole 22, which is of the same diameter as that of the through hole 21, is formed in one side of the section 2. Then, the one sides of the sections 1 and 2 are combined together so that the through holes 21 and 22 are positioned coaxially with each other. As a result, a recess (groove) 6c is formed by opposed corners 6a and 6b of the sections 1 and 2. A torch 64 is moved along the recess 6c to form a weld bead 3 in the recess 6c.

Since the recess (groove) 6c is symmetric with respect to a boundary surface 4 between the sections 1 and 2, the width between the inner and outer edges of the section 1 and that of the section 2 at each welded portion are about the same, so that penetration to the section 1 and penetration to the section 2 become almost equal to each other and a uniform weld bead 3 is formed. Consequently, the sections 1 and 2 are strongly connected together.

Besides, since the hollow portion of the section 1 and that of the section 2 are interconnected through the through holes 21 and 22, the air present in the sections 1 and 2 can move through the through holes 21 and 22 and flow out to the exterior from, for example, end portions of the sections 1 and 2. Therefore, even when the air is heated and expands its volume by the welding heat in the hollow portions of the sections 1 and 2, it is prevented from blowing off through the molten pool during welding because the air moves through the through holes 21 and 22. As a result, it becomes possible to perform the welding work safely and the quality of the weld bead 3 is further improved.

Further, by inserting a fiber scope or the like into the section 1 or 2 from the through holes 21 and 22, it is possible to check the welding state from the hollow portion side of the section 1 or 2 side. In this case, for passing of the fiber scope through the through holes 21 and 22, it is desirable to set the inside diameter of both through holes at 15 mm or so. This value of the inside diameter permits a fiber scope of 11 m in diameter and 3 m in length to be inserted into the hollow portions of the sections 1 and 2. For insertion of the fiber scope into the sections 1 and 2, a through hole is formed beforehand, for example, in a side face of the section 1 which side face does not come into opposition to the section 2. Through this through holes the fiber scope is inserted into the hollow portion of the section 1 and then inserted through the through holes 21 and 22 into the hollow portion of the section 2.

Figure 11A:
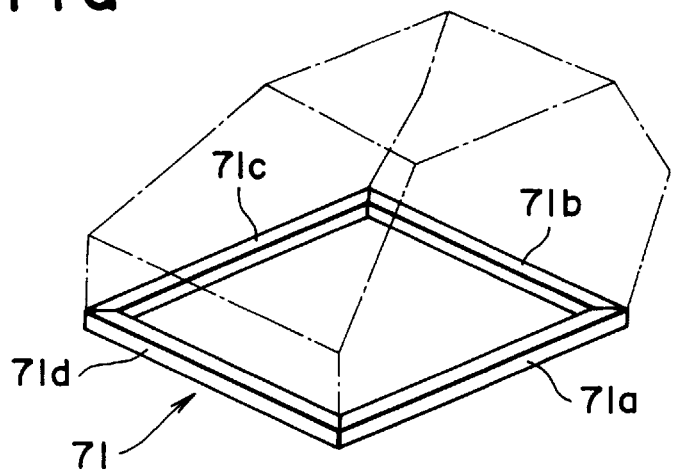
FIG. 11 is a schematic diagram showing how to fabricate a space frame structure of a passenger car.
Figure 11B:
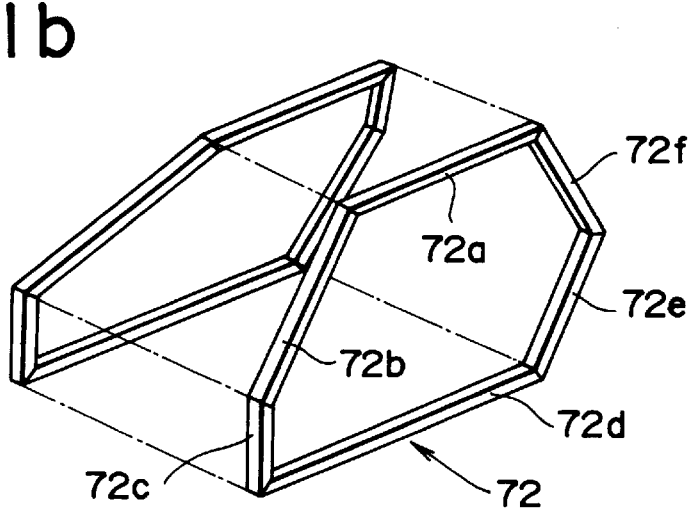

The following description is now provided about a method of fabricating a space frame structure for passenger cars by application of the above first to third embodiments. FIG. 11 is a schematic diagram showing how to fabricate a space frame structure for a passenger car. Various methods have been proposed to fabricate space frame structures for passenger cars. For example, according to one such method, as shown in FIG. 11, end portions of sections 71a to 71d are welded together to form a floor portion 71 as a main frame structure and then pillars or the like shown in phantom are welded to the floor portion 71 to fabricate a space frame structure for a passenger car. According to another method, end portions of sections 72a to 72f are welded together to form a pair of body side portions 72 as a main frame structure and then the body side portions 72 are combined together through beams or the like shown in phantom to fabricate a space frame structure for a passenger car. In both methods, the welded structure fabricating method described above as the first embodiment can be applied to the welding of sections.

Figure 11C:
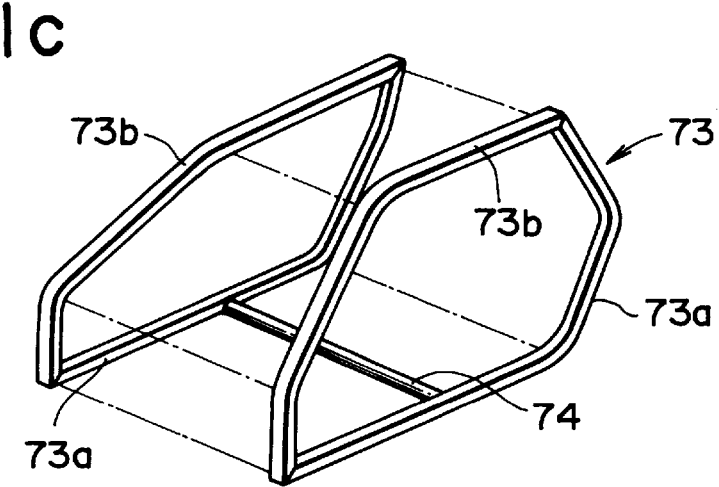

For reducing the number of steps and thereby reducing the cost, there has been proposed such a method as shown in FIG. 11(c). According to this method, a bent member 73b is formed by integral molding of the sections 72a to 72c shown in FIG. 11(b), and a bent member 73a is formed by integral molding of the sections 72d to 72f shown in FIG. 11(b). Next, end portions of the bent members 73a and 73b are connected together to form a body side portion 73. Thereafter, a cylindrical section 74 is welded to lower positions of each body side portion 73, and beams or the like, shown in phantom, are also welded to the body side portions 73, to fabricate a space frame structure for a passenger car.

Figure 12A:
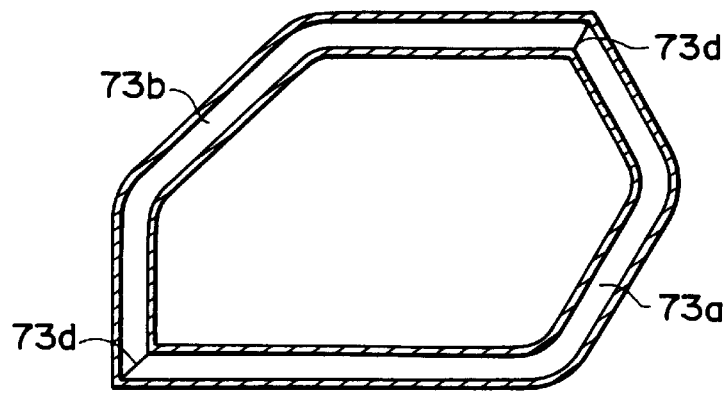
FIG. 12 is a schematic diagram showing the space frame fabricating method step by step.
Figure 12B:
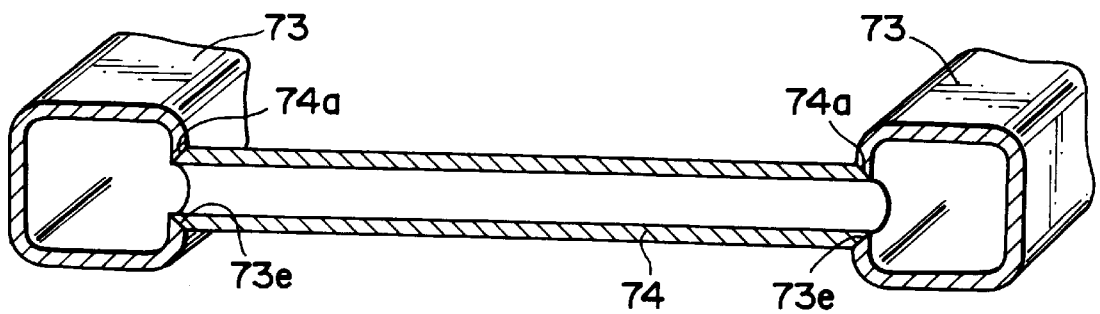
Figure 12C:
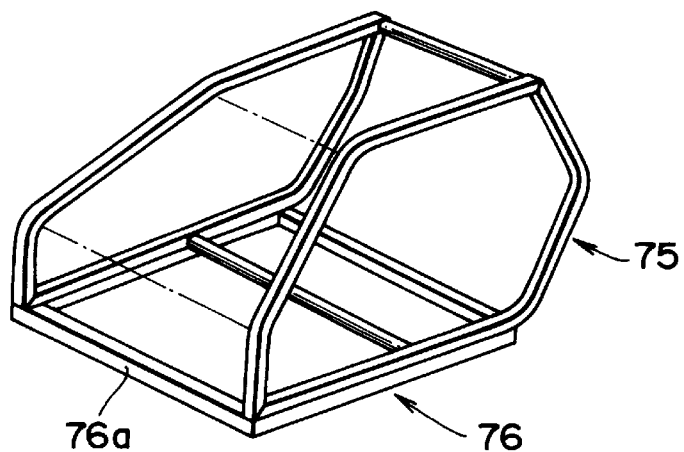

The following description is now provided about how to apply the foregoing embodiments to the space frame structure fabricating method shown in FIG. 11(c). FIG. 12 illustrates step by step how to fabricate a space frame structure for a passenger car, in which (a) is a sectional view showing a body side portion, (b) is a schematic sectional view showing body side portions and a section, and (c) is a perspective view showing a space frame structure for a passenger car. First, as shown in FIG. 12(a), the bent members 73a and 73b are welded together by the method of the first embodiment. To be more specific, end portions of the bent members 73a and 73b are opposed to each other and are formed so as to be symmetric with respect to a boundary surface 73d, then welded together, whereby the bent members 73a and 73b are firmly combined together.

Next, the assembled body side portions 73 and a cylindrical section 74 are welded together by the method of the second embodiment. More specifically, a through hole 73e is formed in the lower portion of each body side portion 73, and both end portions 74a of the cylindrical section 74 are formed in a convex shape. Then, both end portions 74a of the section 74 are fitted in the through holes 73e, followed by welding to fix them. In this way there is obtained such a space frame structure for a passenger car as shown in FIG. 11(c).

The space frame structure 75 for a passenger car thus obtained can be fixed to a floor main 76 by the method of the third embodiment. In this case, a through hole 76a is formed beforehand in one side of the floor main 76 which is in the shape of a frame, and the through holes shown in FIGS. 9 and 10 are formed beforehand in the space frame structure 75 and the floor main 76, respectively. Next, the space frame structure 75 is placed on the floor main 76 so that the through hole (the through hole 21 shown in FIG. 9) formed in the space frame structure 75 and the through hole (the through hole 22 shown in FIG. 9) formed in the floor main 76 are coaxial with each other. Thereafter, the contacted portion of the floor main 76 and the space frame structure 75 are welded together by the method of the third embodiment, whereby the floor main 76 and the space frame structure 75 are connected together strongly.

The state of welding can be checked by inserting a fiber scope, for example, into the space frame structure 75 through the through holes (21 and 22 in FIG. 9).

By forming the space frame structure in the above manner it is possible to form, for example, a chassis portion of a passenger car or a cabin portion of a truck.

Figure 13:
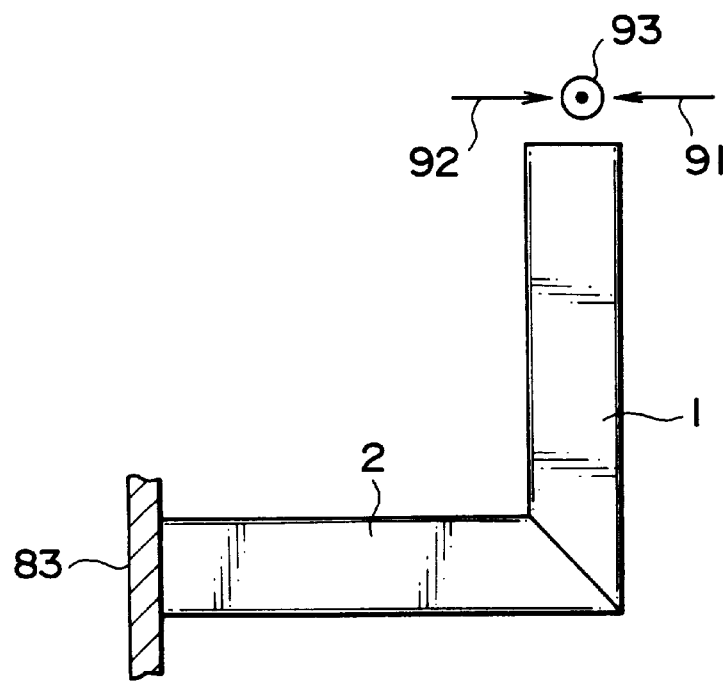
FIG. 13 is a front view showing how to apply a load.
Figure 14:
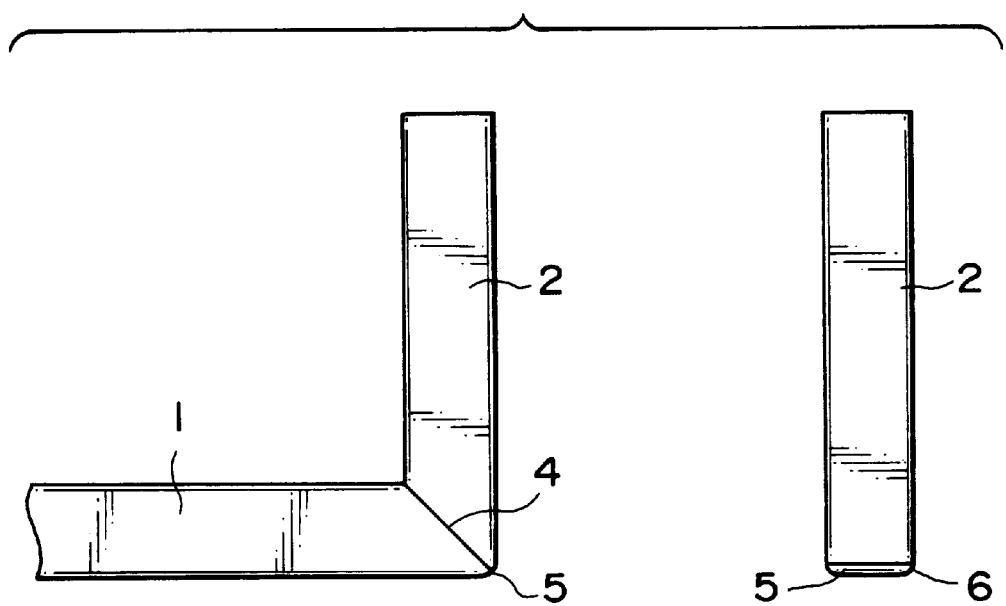
FIG. 14 is a front view showing Examples 1 and 2.
Figure 15A:
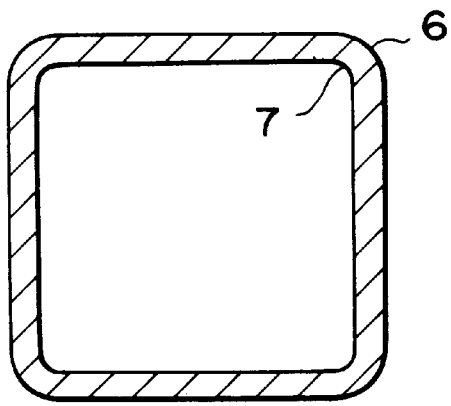
FIG. 15 is a sectional view showing Examples 1 and 2.
Figure 15B:
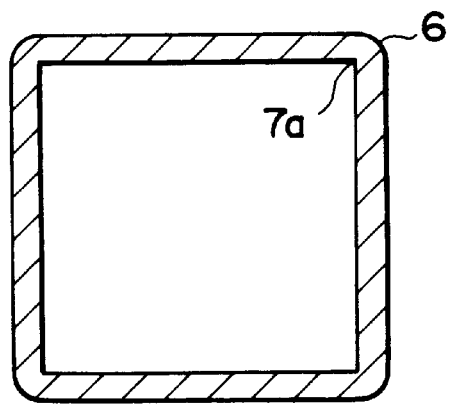
Figure 16:
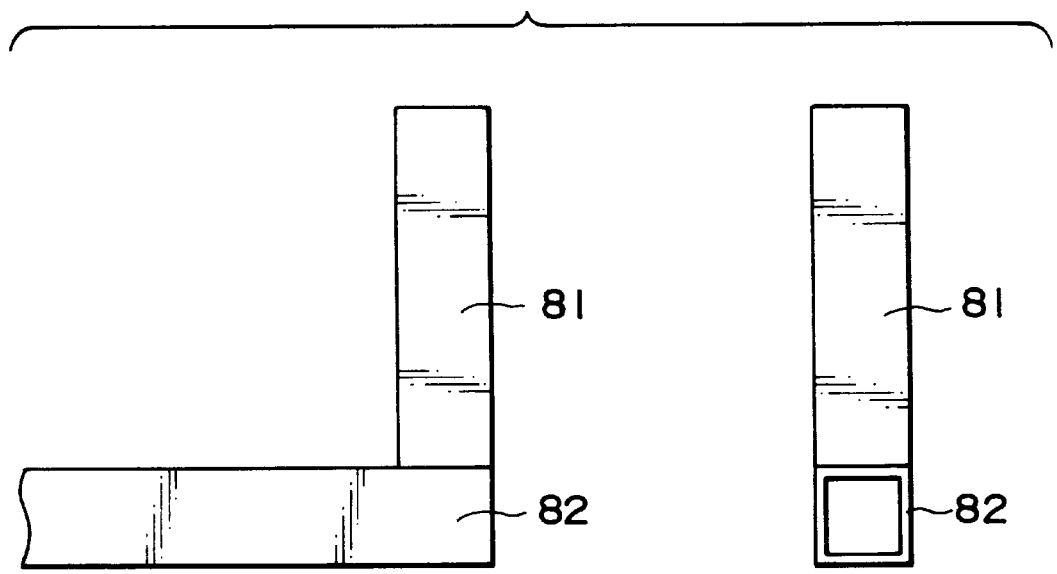
FIG. 16 is a sectional view showing a comparative example.
Figure 17:
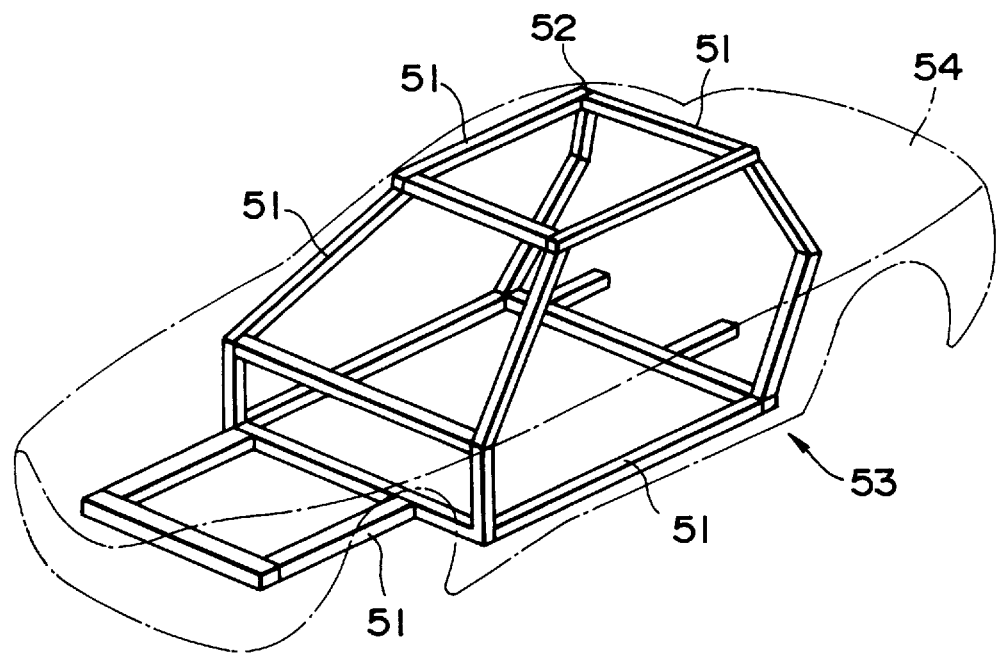
FIG. 17 is a schematic diagram showing a space frame structure whose application to ordinary passenger cars has been proposed.
Figure 18:
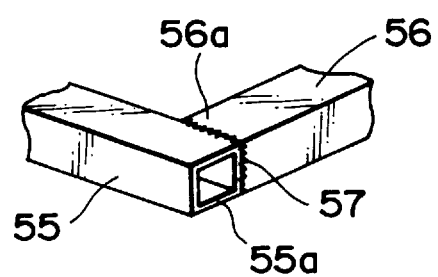
FIG. 18 is a perspective view showing on a larger scale a welded portion of sections illustrated in FIG. 17.
Figure 19:
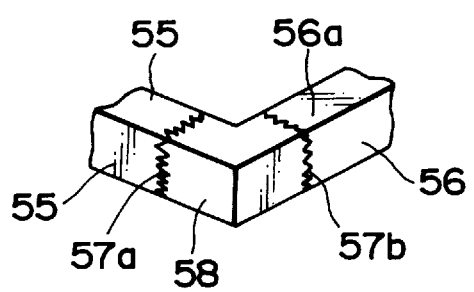
FIG. 19 is a perspective view showing on a larger scale a welded portion of sections illustrated in FIG. 17.
Figure 20A:
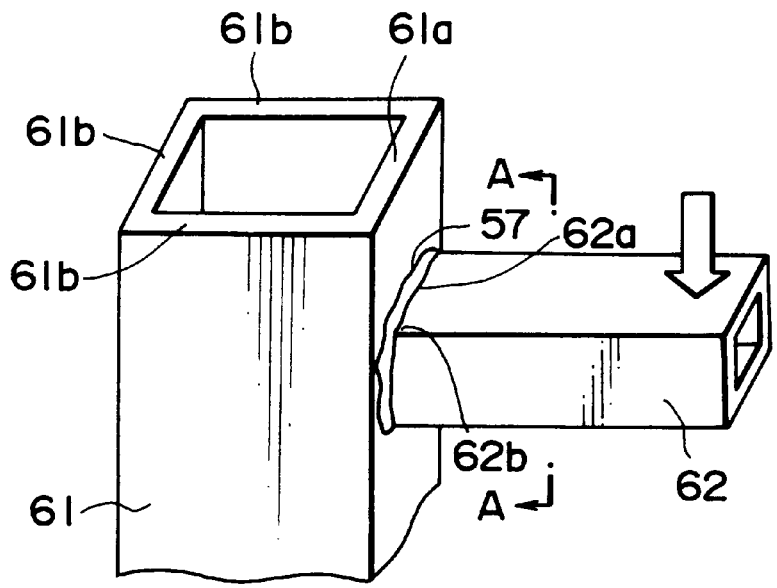
FIG. 20 is a perspective view showing welded portions of conventional welded structures.
Figure 20B:
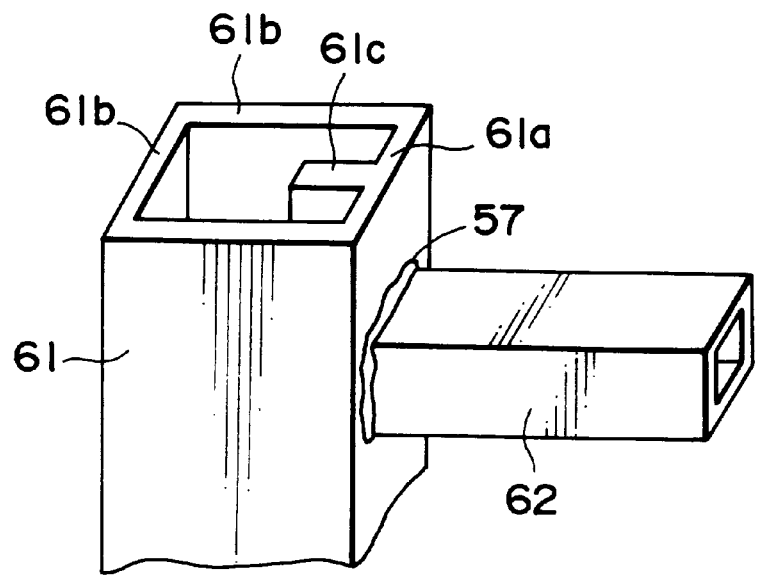
Figure 21:
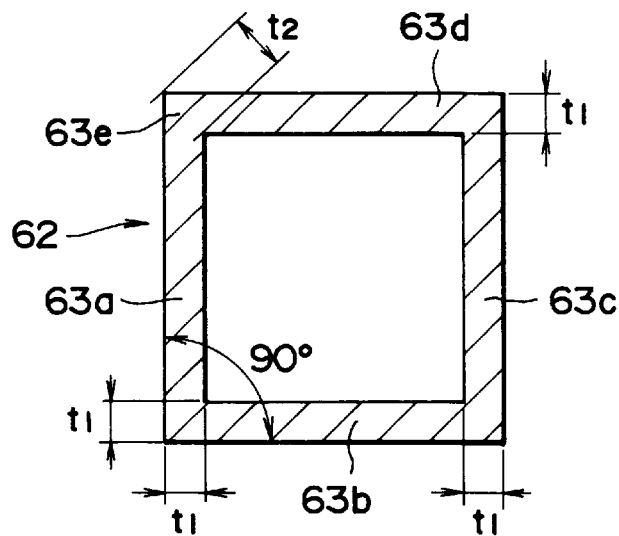
FIG. 21 is an enlarged sectional view taken on line A—A in FIG. 20(a)
Figure 22A:
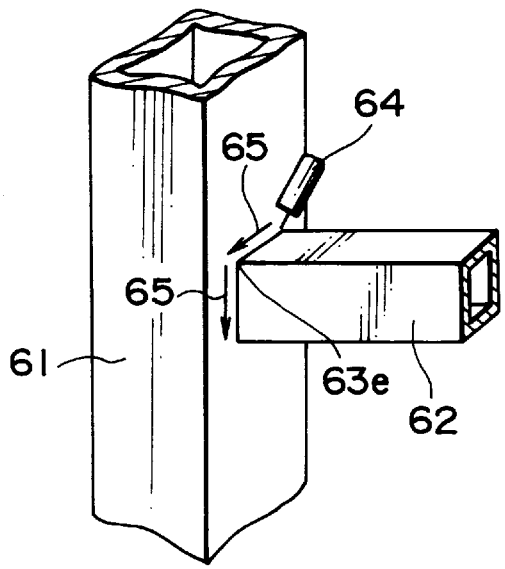
FIG. 22 is a diagram showing in what manner the welded structure of FIG. 20(a) is formed by welding.
Figure 22B:
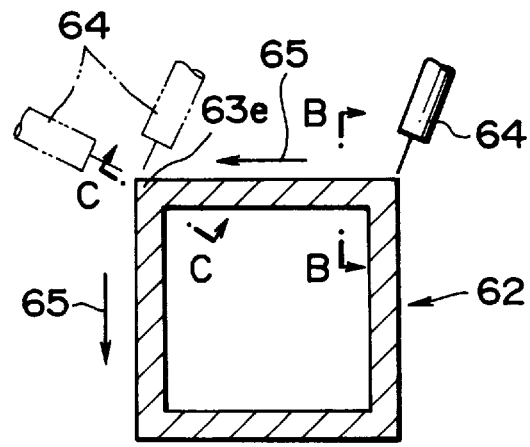
Figure 23A:
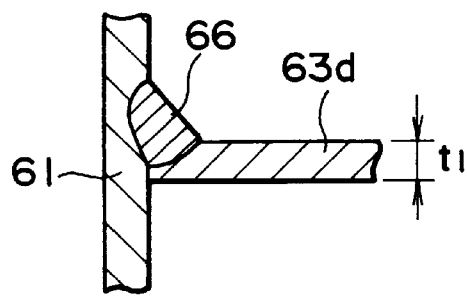
FIGS. 23(a) and 23(b) are enlarged sectional views taken on lines B—B and C—C, respectively, in FIG. 24(b)
Figure 23B:
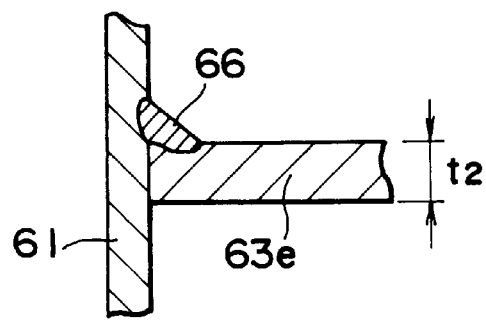
Figure 23C:
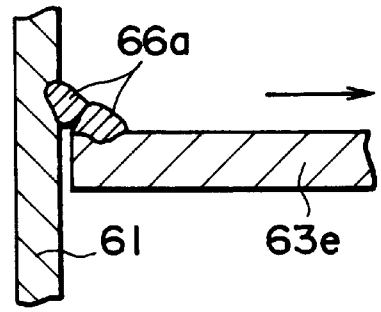
FIG. 23(c) is a sectional view showing a breaking state of a weld metal portion illustrated in (b)
Figure 24:
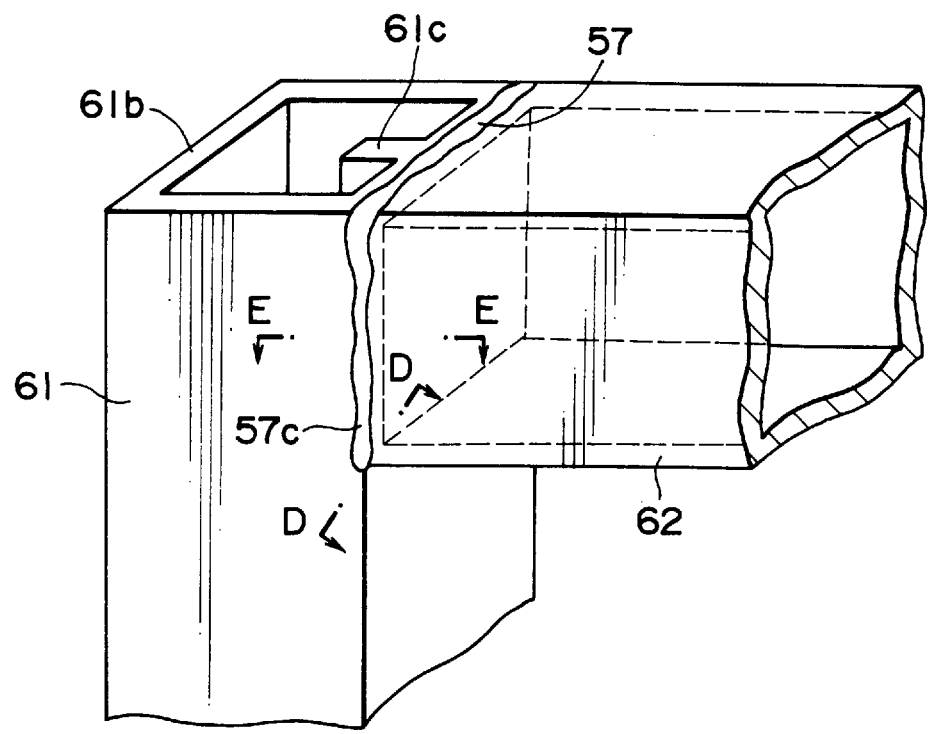
FIG. 24 is a perspective view showing a welded portion of sections having the same external dimension in a conventional welded structure.
Figure 25A:
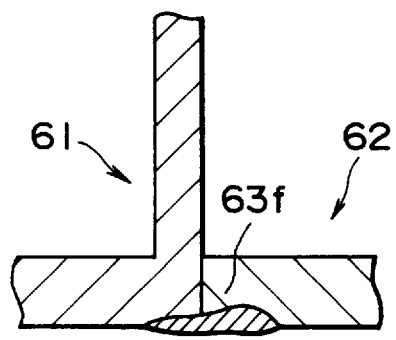
FIG. 25 is a sectional view taken on lines D—D and E—E in FIG. 24.
Figure 25B:
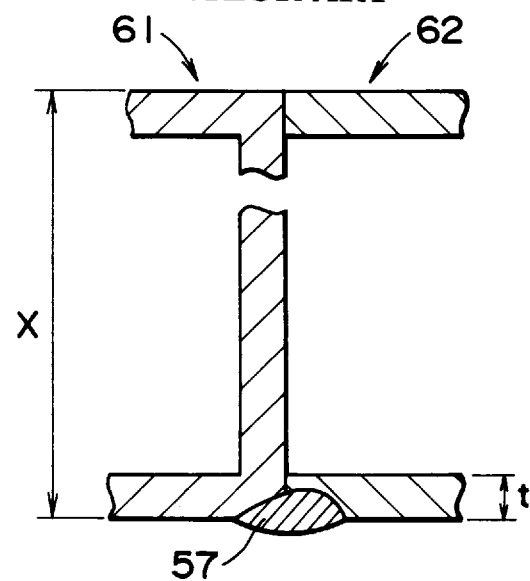

Description is now directed to working examples (Examples 1 and 2) of the present invention and a comparative example. FIGS. 13 to 16 illustrate test samples used, of which FIG. 13 is a front view showing a load applying method, FIG. 14 is a front view showing Examples 1 and 2, FIG. 15 is a sectional view showing Examples 1 and 2, and FIG. 16 is a front view showing a comparative example. In these figures, the same portions as in FIG. 1 are indicated by the same reference numerals and detailed explanations thereof are here omitted.

As shown in FIG. 13, an end face 1a of a section 1 and an end face 2a of a section 2 were welded together at a connection angle between the sections 1 and 2 of 90° to form a test sample. The test sample was then fixed to a wall 83 perpendicular to the ground surface. In this state, such loads as indicated with arrows 91 and 92 were applied to the inner surface of the section 1 to check a maximum load of the test sample and the state of breaking thereof. Further, a like load was applied to the outer surface of the section 1 in the direction indicated at 93 (from the back to the surface of the paper) to conduct the same test as above.

The test samples of Examples 1 to 3 were all obtained by the method of the first embodiment. In Examples 1 and 2, as shown in FIG. 14, the shape of a groove (the boundary between the sections 1 and 2) is symmetric, and a plane part 5 having a width of 1.7 mm is formed. In Example 1, as shown in FIG. 15(a), an outer surface 6 of each corner is rounded at a radius of 5 mm, and an inner surface 7 of each corner is rounded at a radius of 2 mm. In Example 2, as shown in FIG. 15(b), an outer surface 6 of each corner is rounded at a radius of 3 mm, while an inner surface 7 of each corner is not rounded.

On the other hand, in a comparative example, an end portion of a section 81 was welded to a side face of a section 82, as shown in FIG. 16, and the section 82 was fixed to a wall, followed by execution of the same test as above. In each of the working examples and comparative example there was used a square pipe-like section defined by JIS A6N01-T5.

The results of the tests are as set out in Table 1.

TABLE 1

| No. | Load Applying Direction (Arrows in FIG. 14) | Maximum Load (kgf) | State of Breaking |
| --- | --- | --- | --- |
| Ex. 1 | 91 | 353 | Welding HAZ deformed |
|  | 92 | 367 | Welding HAZ deformed |
|  | 93 | 316 | Welding HAZ deformed |
| Ex. 2 | 91 | 355 | Welding HAZ deformed |
|  | 92 | 371 | Welding HAZ deformed |
|  | 93 | 192 | Base metal corner broke |
| Comp. Ex. | 91 | 150 | Weld metal broke |
|  | 92 | 280 | Weld metal broke |
|  | 93 | 188 | Base metal corner broke |

In Examples 1 and 2, as shown in Table 1 above, maximum loads were larger in all load applying directions than in the comparative example. Particularly in Example 1, the state of breaking was neither the breaking of a base metal corner nor the breaking of weld metal, but was caused by deformation of a welding HAZ (Heat Affected Zone), and thus the state of breaking was good.

As set forth above, according to the welded structure fabricating method in the first aspect of the invention, the angle between an end face of a first square section and the axis thereof and the angle between an end face of a second square section and the axis thereof are equal to each other. Consequently, both reliability and strength of the welded portion are improved.

According to the welded structure fabricating method in the second aspect of the invention, an end face of a cylindrical section is chamfered so that its inner surface side if convex, and a through hole having a hole face is formed in a square section, then the end portion of the cylindrical shape is made face to face with the through hole of the square section, followed by welding of the two in the circumferential direction. Consequently, both reliability and strength of the welded portion are improved.

According to the welded structure fabricating method in the third aspect of the present invention, there are provided first and second square sections having roundish outer surfaces of corners, then side portions of the sections are combined together so that the respective axes extend in the same direction to form a groove, and welding is performed along the groove. Consequently, not only the reliability of the welded portion but also the strength thereof is improved.

According to the welded structure fabricating method in the fourth aspect of the present invention, first and second cylindrical sections are abutted with each other so that the width between the inner and outer edges of the abutted face of the first section and that of the second section are substantially the same, then welding is performed around the boundary surface. Therefore, the welded portion is improved in both reliability and strength.

What is claimed is:

1. A method of fabricating a welded structure, comprising the steps of:

providing first and second aluminum or aluminum alloy elements having substantially square sections with substantially the same wall thickness, the first and second elements having rounded corners such that circumferential wall thicknesses of each of said square thicknesses is uniform, wherein an angle between an end face of the first substantially square section element and an axis thereof is substantially equal to an angle between an end face of the second substantially square section element and an axis thereof;

arranging the end faces of said first and second elements in abutment with each other so as to form a circumferential boundary between the abutted first and second elements, said angle between the end face of the first substantially square section element and the axis thereof, and the angle between the end face of the second substantially square section element and the axis thereof being selected such that said first and second elements form an acute angle part at a circumferential portion of the boundary;

chamfering at least one of said first and second elements at said acute angle part to form a plane part perpendicular to the end faces of said first and second elements as viewed in a section passing through said axes; and welding said first and second elements together at said circumferential boundary.

2. A method according to claim 1, wherein said welding is performed after application of a filler metal to said plane part.

3. A method according to claim 1, wherein when the wall thickness of said first and second square sections is t and the width between the inner and outer edges of each end face in said abutted portion is T, t and T satisfy the relation of $t/2 < T < t$.

4. A method according to claim 2, wherein when the wall thickness of said first and second square sections is t and the width between the inner and outer edges of each end face in said abutted portion is T, t and T satisfy the relation of $t/2 < T < t$.

5. A method according to any one of claims 1 to 4, wherein when an external dimension of a short side in a section perpendicular to the axis of said first square section is $H_1$ and the wall thickness thereof is t, the radius of curvature R of said corner outer surface satisfies the relation of $t < R < H_1/3$.

* * * * *